United States Patent
Wojtasinski et al.

(10) Patent No.: US 11,735,905 B2
(45) Date of Patent: Aug. 22, 2023

(54) PINCH DETECTION BASED ON ESTIMATED PINCH FORCE

(71) Applicant: Aptiv Technologies Limited, St. Michael (BB)

(72) Inventors: Pawel Wojtasinski, Cracow (PL); Mateusz Romaszko, Cracow (PL)

(73) Assignee: Aptiv Technologies Limited, St. Michael (BB)

( * ) Notice: Subject to any disclaimer, the term of this patent is extended or adjusted under 35 U.S.C. 154(b) by 85 days.

(21) Appl. No.: 17/513,809

(22) Filed: Oct. 28, 2021

(65) Prior Publication Data
US 2022/0158442 A1    May 19, 2022

(30) Foreign Application Priority Data

Nov. 17, 2020 (EP) .................................... 20208151

(51) Int. Cl.
  *H02H 7/08* (2006.01)
  *H02H 7/085* (2006.01)
  *E05F 15/41* (2015.01)
  *E05F 15/695* (2015.01)

(52) U.S. Cl.
  CPC .......... *H02H 7/0851* (2013.01); *E05F 15/41* (2015.01); *E05F 15/695* (2015.01); *E05Y 2900/531* (2013.01); *E05Y 2900/55* (2013.01)

(58) Field of Classification Search
  CPC .............................. H02H 7/0851; E05F 15/41
  See application file for complete search history.

(56) References Cited

U.S. PATENT DOCUMENTS

| 4,641,067 A | 2/1987 | Iizawa et al. |
| 5,399,950 A * | 3/1995 | Lu .................... H02H 7/0851 |
| | | 318/434 |
| 5,734,245 A | 3/1998 | Terashima et al. |
| (Continued) | | |

FOREIGN PATENT DOCUMENTS

| CN | 101220724 | 7/2008 |
| CN | 202899882 | 4/2013 |
| (Continued) | | |

OTHER PUBLICATIONS

"Extended European Search Report", EP Application No. 20208151.9, dated Apr. 28, 2021, 7 pages.

(Continued)

*Primary Examiner* — Rina I Duda
(74) *Attorney, Agent, or Firm* — Sawtooth Patent Group PLLC (57) ABSTRACT

The pinch detector includes a torque estimator that estimates a motor torque from current values of physical quantities of the motor including a motor voltage, a motor current and a motor speed, using coefficients of an approximation function that calculates an energy conversion efficiency of the motor as a function of the motor torque; a converter that calculates a first estimation of a pinch force exerted by the opening and closing member on a pinched object by converting the estimated motor torque into an estimated pinch force using a torque to force conversion coefficient; a comparator that compares the estimated pinch force with a predetermined force limit in order to detect a pinch based on the comparison result.

20 Claims, 7 Drawing Sheets

(56) References Cited

U.S. PATENT DOCUMENTS

| | | | |
|---|---|---|---|
| 5,977,732 A | 11/1999 | Matsumoto | |
| 6,051,945 A * | 4/2000 | Furukawa | H02H 7/0851 318/264 |
| 6,239,610 B1 | 5/2001 | Knecht et al. | |
| 6,274,947 B1 | 8/2001 | Terashima | |
| 6,362,584 B1 | 3/2002 | Rogovin | |
| 6,573,677 B2 * | 6/2003 | Gerbetz | H02H 7/0851 318/434 |
| 6,633,147 B2 * | 10/2003 | Gerbetz | E05F 15/41 318/434 |
| 6,794,837 B1 | 9/2004 | Whinnery et al. | |
| 8,620,531 B2 | 12/2013 | Morawek | |
| 10,047,553 B2 | 8/2018 | Shibata | |
| 10,337,230 B2 | 7/2019 | Kigoshi et al. | |
| 11,454,061 B2 | 9/2022 | Fujita | |
| 2002/0101210 A1 | 8/2002 | Boisvert et al. | |
| 2002/0190680 A1 * | 12/2002 | Gerbetz | H02H 7/0851 318/445 |
| 2003/0051555 A1 | 3/2003 | Fukumura et al. | |
| 2004/0079867 A1 | 4/2004 | Gallo et al. | |
| 2005/0187688 A1 | 8/2005 | Bigorra et al. | |
| 2006/0267453 A1 | 11/2006 | Sugiura | |
| 2006/0293821 A1 | 12/2006 | Takahashi | |
| 2008/0079379 A1 | 4/2008 | Odland et al. | |
| 2009/0056385 A1 | 3/2009 | Maekawa | |
| 2010/0039057 A1 | 2/2010 | Tsai | |
| 2011/0210755 A1 | 9/2011 | Ogawa | |
| 2011/0265381 A1 | 11/2011 | Guamizo | |
| 2012/0032618 A1 | 2/2012 | Stoeger | |
| 2014/0173984 A1 | 6/2014 | Schlesiger et al. | |
| 2014/0239867 A1 | 8/2014 | Bessho et al. | |
| 2017/0113652 A1 | 4/2017 | Tokudome | |
| 2020/0018111 A1 | 1/2020 | Akbarian et al. | |
| 2020/0249752 A1 | 8/2020 | Parshionikar | |
| 2023/0062859 A1 | 3/2023 | Gowda | |

FOREIGN PATENT DOCUMENTS

| | | |
|---|---|---|
| DE | 19601359 | 7/1997 |
| DE | 102009028914 | 3/2011 |
| DE | 102012011117 | 12/2013 |
| EP | 0692856 | 1/1996 |
| EP | 2175330 | 4/2010 |

OTHER PUBLICATIONS

"Extended European Search Report", EP Application No. 20208149.3, dated Apr. 30, 2021, 6 pages.

"Extended European Search Report", EP Application No. 20208150.1, dated Apr. 30, 2021, 7 pages.

"Extended European Search Report", EP Application No. 20208152.7, dated May 3, 2021, 6 pages.

"Extended European Search Report", EP Application No. 20208153.5, dated May 11, 2021, 7 pages.

"Extended European Search Report", EP Application No. 21204569.4, dated Mar. 21, 2022, 8 pages.

"Foreign Office Action", EP Application No. 20208151.9, dated May 31, 2023, 4 pages.

\* cited by examiner

PINCH DETECTION BASED ON ESTIMATED PINCH FORCE

CROSS-REFERENCE TO RELATED APPLICATION

This application claims priority to European Patent Application Number 20208151.9, filed Nov. 17, 2020, the disclosure of which is hereby incorporated by reference in its entirety herein.

BACKGROUND

The present disclosure relates to the field of opening and closing member actuated by a motor, especially members such as power windows, sliding doors or sliding roofs in vehicles, which are provided with an anti-pinch detector to provide protection against injuries. More specifically, the present disclosure relates to a pinch detector suitable to detect a pinch at a closing member, a control apparatus for controlling the member actuated by a motor, and a method to detect a pinch at a closing member.

Power windows (i.e., windows activated by an electric motor) are getting very popular nowadays, even in low-range vehicles.

It happens that children try to put their neck or hands out through the window. If anyone operates the window switch to close the window at the same time, it may cause suffocation or injuries to the child. The risk also arises in case of power windows which are programmed to operate without even the need to press the switch, for example when a global closing function is activated.

Windows are moved with clamping forces of up to 350 N. This means that a thin glass plate of only about 8 mm thickness can press up to 35 kg (e.g. onto a child's hand or head). It takes only 98 N to suffocate or injure a small child. To avoid such mishaps, an anti-pinch technology has been developed.

Figure 1:
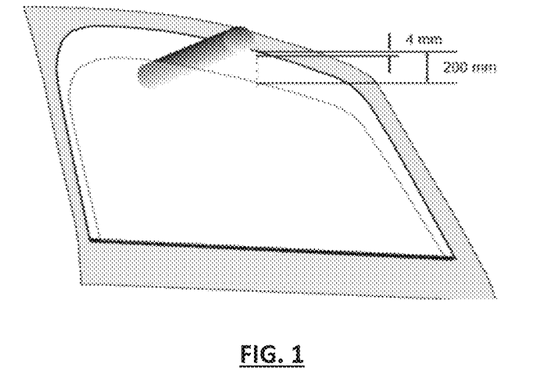
FIG. 1 shows an obstacle placed in a space left between a window and a door frame, in a vehicle, and a range of vertical positions in which compliance with a limit of pinch force defined by standards must be monitored.

The anti-pinch technology of a power window has to meet standards for example issued by the European Union and/or the United States. According to known standards, the maximum force a power window is allowed to exert on any object is 100 N and compliance with this limit must be monitored and enforced in a range of 4 mm to 200 mm minimum from the top window frame, as shown in FIG. 1. It is also important to deactivate the anti-pinch algorithm immediately before the window seal is reached (distance 4 mm from top seal), so that the window can close completely. In addition, to avoid overload and damage to the window motor, blocking must not last too long.

Document US 2014/239867 A1 discloses a pinch detection apparatus for an opening and closing member actuated by a motor which comprises a reference data storage portion calculating load data on the basis of a rotation speed of the motor and an environmental temperature.

Document US 2003/051555 A1 discloses a pinch detection system based on the calculation of reference motor torque using voltage and speed measurements. To this end, it requires at least one dedicated speed sensor, such as an encoder or a Hall effect sensor, that determines the rotational speed of the motor. A voltage sensor provides information to a force calculator which calculates the motor force. A difference between an actual force and a reference force can thus be determined. A pinch condition is indicated if the force difference exceeds a predetermined threshold.

Document U.S. Pat. No. 6,239,610 B1 discloses a solution based on the voltage induced in the armature motor of the electric drive system used for moving the window.

Lots of known solutions require an additional equipment such as force or speed sensors, which involves an additional cost, require more space in a relatively constrained environment and does not allow to increase the reliability of the entire system.

Document CN101220724A discloses an anti-pinch device for a power window requiring no additional sensor. An armature current signal is obtained, and it is judged whether or not the motion of the window is obstructed by an obstacle according to the current and using a constant current threshold.

When a window in a vehicle clamps an obstacle, for example a body part of a passenger, the window applies a clamping force on this obstacle. A direct measurement of this force requires the use of an additional equipment, which generates additional costs.

There is a need for improving existing anti-pinch solutions in order to at least partially overcome the aforementioned issues and drawbacks.

SUMMARY

The present disclosure concerns a pinch detector suitable to detect a pinch at a closing member actuated by a motor, including a torque estimator that estimates a motor torque from current values of physical quantities of the motor including a motor voltage, a motor current and a motor speed, using coefficients of an approximation function that calculates an energy conversion efficiency of the motor as a function of the motor torque; a converter that calculates a first estimation of a pinch force exerted by the opening and closing member on a pinched object by converting the estimated motor torque into an estimated pinch force using a torque to force conversion coefficient; a comparator that compares the estimated pinch force with a predetermined force limit in order to detect a pinch based on the comparison result.

The present pinch detector can efficiently detect the occurrence of a pinch at the closing member based on simple calculations. It is fast, requires only a low resource consumption and easy to implement. It is also easy to adjust the pinch detector to the installation of the member by adjusting a few parameters. In addition, motor current and motor voltage can be simply measured. These measurements also allow to estimate the motor speed by known methods.

In some embodiments, the torque estimator calculates an estimated motor torque by using two coefficients of a function of linear approximation.

The torque estimator can calculate an estimated motor torque by using the equation $$\tau = \frac{b \cdot V \cdot I}{\omega - a \cdot V \cdot I}$$

where
a and b are the two linear coefficients of the linear function $$\eta = a\tau + b$$

that calculates the energy conversion efficiency $\eta$ of the motor as a function of the motor torque $\tau$; V, I and $\omega$ are respectively the motor voltage, motor current and motor angular speed.

The pinch estimator can further include a first calculator that calculates an estimation of a friction force exerted by the member on the object; and a second calculator that calculates a second estimation of the pinch force by subtracting the estimated friction force from the estimated pinch force calculated by the converter.

The introduction of the estimated friction force for the estimation of the pinch force allows to obtain a better estimated pinch force, more similar to a measured pinch force.

In a particular embodiment, the comparator compares the estimated pinch force output from the second calculator with the predetermined limit in order to detect a pinch based on the comparison result.

The first calculator can calculate the friction force as the sum of a static friction force and a viscosity damping force.

The first calculator can calculate an approximation of the viscosity damping force by multiplying the motor speed with a viscosity damping coefficient.

The first calculator can obtain a fixed value of the friction force from a memory.

The present disclosure also concerns a control apparatus for controlling an opening and closing member actuated by a motor, including a pinch detector as previously defined, and a portion that generates a control signal to control at least one of the two actions of stopping the member and reversing the direction of movement of the member, when a pinch is detected.

The present disclosure also concerns a system including an opening and closing member; a motor for activating the member; a first measuring circuit to measure a motor current; a second measuring circuit to measure a motor voltage; a motor angular speed estimator that estimates an angular speed of the motor from the measured motor voltage and the measured motor current; a pinch detector as previously defined.

The present disclosure also concerns a vehicle including the system above defined.

The present disclosure also concerns a method to detect a pinch at a closing member actuated by a motor, including the steps of estimating a motor torque from current values of physical quantities of the motor including a motor voltage, a motor current and a motor speed, using coefficients of an approximation function that calculates an energy conversion efficiency of the motor as a function of the motor torque; calculating a first estimation of a pinch force exerted by the closing member on a pinched object by converting the estimated motor torque into an estimated pinch force using a torque to force conversion coefficient; comparing the estimated pinch force with a predetermined force limit in order to detect a pinch based on the comparison result Advantageously, the step of estimating the motor torque uses the equation $$\tau = \frac{b \cdot V \cdot I}{\omega - a \cdot V \cdot I}$$

where
a and b are the two linear coefficients of the linear function $$\eta = a\tau + b$$

that calculates the energy conversion efficiency $\eta$ of the motor as a function of the motor torque $\tau$; V, I and $\Omega$ are respectively the motor voltage, motor current and motor angular speed.

The method can further include the steps of calculating an estimation of a friction force exerted by the member on the object; and calculating a second estimation of the pinch force by subtracting the estimated friction force from the estimated pinch force.

The present disclosure further concerns a non-transitory computer readable medium including program instructions for causing a processor to execute the method.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

The present disclosure relates to pinch detection to detect a pinch at a closing member actuated by a motor (for example a power window in a vehicle) and is more precisely dedicated to pinch detection based on an estimation of a pinch force with which the member pinches, or clamps, an object, such as a body part.

First Embodiment

Figure 2:
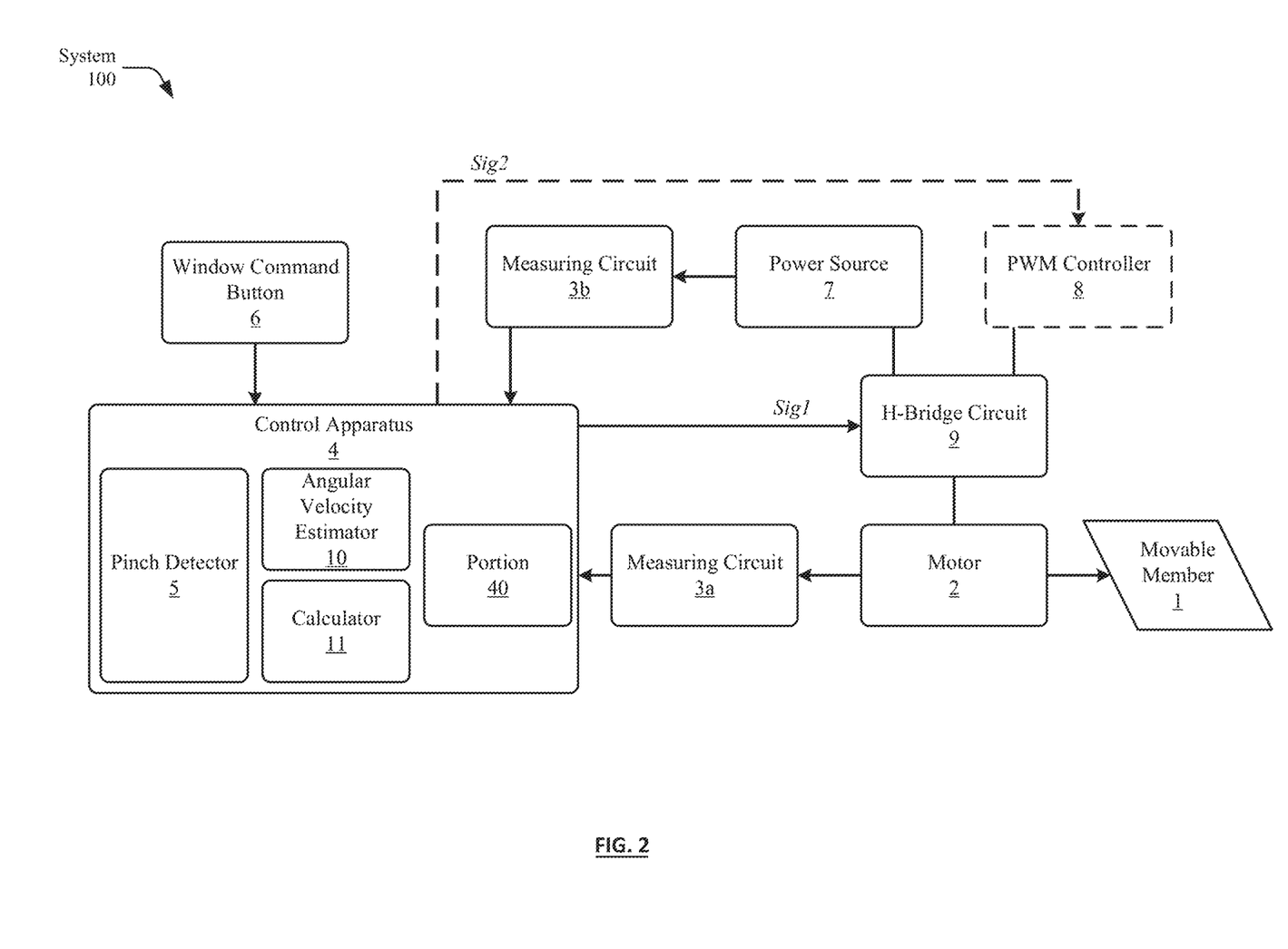
FIG. 2 represents a system including a closing and opening member equipped with a pinch detector, according to a particular embodiment.

With reference to FIG. 2, a first embodiment of a closing and opening system 100 with an anti-pinch protection includes a movable member 1, an electric motor 2 for actuating the member 1, one or more measuring circuits 3a, 3b (or measuring device(s), or sensor(s)) to measure one or more physical quantities relative to the motor 2, a control apparatus 4 for controlling the motor 2, and a pinch detector 5 for pinch detection at the closing member 1.

The movable member 1 is an opening and closing member such as a window, a door, a roof, a shutter, etc., that can move, for example in translation or rotation, between a closed position where the member closes an opening area and an open position where the member is removed from the opening area.

For example, the motor is a DC (direct current) motor powered by a direct current source (power source 7), e.g. an electrical battery, for supplying power to the motor 2.

In the first embodiment, a PWM controller 8 can be used to control supplying power as a PWM signal to the motor 2. The PWM signal is characterized by a PWM frequency and a PWM duty cycle. The PWM duty cycle can vary during the motor operation. For example, the PWM duty cycle can increase from an initial value (0% or more) to a final value, that is usually 100% (but could be less than 100%), when the motor starts. Then, it is stationary when the motor 2 operates at full speed and it finally decreases before stopping. The PWM controller 8, shown in dotted lines in FIG. 2, is optional. In other embodiments, the system 100 does not include a PWM controller 8.

A structure for supplying a direct voltage V to the motor 2 can include the voltage battery 7 that supplies a direct and fixed voltage $V_{batt}$, the PWM controller 8 that supplies a PWM signal, and a H-bridge circuit 9 that receives as inputs the PWM signal generated by the PWM controller 8 and the direct battery voltage $V_{batt}$ supplied by the battery 7 and produces as an output a direct voltage V supplied to the motor 2.

The control apparatus 4 controls the motor 2 to move the closing and opening member 1. It has a portion 40 that generates a control signal to control the movement of the motor 2 and member 1. In some embodiments, the motor movement is controlled by a control signal Sig2 generated by the control apparatus 4 and transmitted to the PWM controller 8, as represented in FIG. 2. In this way, the H-bridge circuit 9 is controlled through the PWM controller 8. In other embodiments, the system 100 does not include a PWM controller 8. In that case, a control signal Sig1 is generated by the control apparatus 4 and transmitted directly to the H-bridge circuit 9, as shown in FIG. 2. It allows to control the motor direction movement (clockwise, counter-clockwise and stop).

A user interface means can also be provided to enter user commands, for example to stop or move the member. It can include for example a window command button 6 that can be pressed up to move up the window 1 or pressed down to move down the window 1.

In the first embodiment, the motor 2 is equipped with two measuring circuits 3a and 3b to measure two physical quantities (or physical values) relative to the motor 2, including a current and a voltage. The motor current can be an armature current I flowing through an armature winding of the motor 2, and the voltage V can be the direct voltage supplied to the motor 2.

Figure 10:
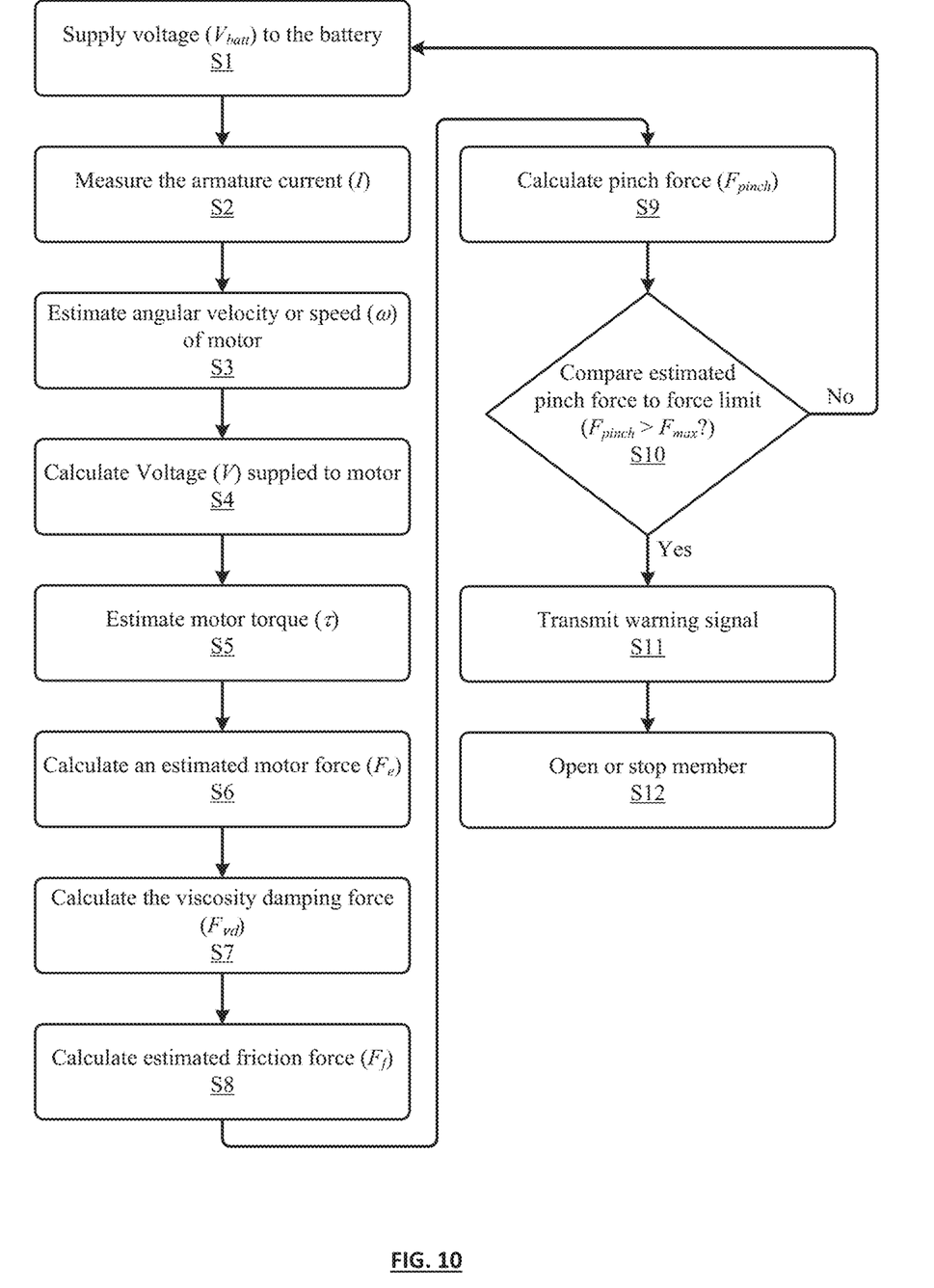
FIG. 10 represents a flow chart of a method of pinch detection, corresponding to the operation of the pinch detector of FIG. 3.

In operation, the measuring circuit 3a measures the armature current I in a step S2, and the measuring circuit 3b measures the battery voltage $V_{batt}$ supplied to the motor through the H-bridge circuit 9 in a step S1 Each measuring circuit 3a, 3b measures values of the corresponding physical quantity at successive times, for example with a predetermined measurement frequency. The measured values of current and voltage are transmitted to the control apparatus 4 by the measuring circuits 3a, 3b.

In a step S4, a calculator 11 calculates the direct voltage V supplied to the motor 2 using the equation $V=V_{batt}*PWM_{DC}$, where $PWM_{DC}$ is the PWM duty cycle of the PWM controller 8 and $V_{batt}$ is the battery voltage measured by the measuring circuit 3b. The calculator 11 can be a software or hardware component. It can be implemented in the control apparatus 4. It can be a component of the pinch detector 5. As previously indicated, in some embodiments, the system 100 does not include a PWM controller 8. In that case, the voltage supplied to the motor is equal to the battery voltage $V_{batt}$.

In the first embodiment, in a step S3, an angular velocity estimator 10 estimates a motor angular velocity or speed ω, based on the shaft angular position φ. Actually, in the present embodiment, the shaft angular position is not measured directly, which allows to avoid an extra external sensor embedded in the vehicle. The shaft angular position φ is estimated by a specially dedicated ripple count algorithm using the measured battery voltage $V_{batt}$ and measured armature current I flowing through the windings (armature) of the motor 2. Current ripples are small current fluctuations associated with the commutation phenomenon of a DC motor. A typical commutated brushed direct current (BDC) motor works by use of brushes which carry current to the commutation surfaces which in turn power the coils that create magnetic field to produce torque on the motor shaft. As the motor shaft rotates, the brushes come into contact with a different set of commutation surfaces. Most of the time, each brush touches two commutation surfaces. However, during every transition, each brush touches only one contact for a brief instant. During this transition, the current path changes and the internal resistance and inductance change. This in turn alters the current draw by the motor. The repetition of this process causes the current ripple which is seen on such motors. The number of ripples per one full motor shaft revolution corresponds to the number of poles. The rotational position of the shaft is determined based on detected ripples and then counted.

The angular velocity estimator 10 can be a software or hardware component. It can be implemented in the control apparatus 4. It can be a component of the pinch detector 5.

The pinch detector 5 can be part of the control apparatus 4. In operation, it implements the method (or algorithm) of pinch detection, described thereafter, to detect a pinch at the opening and closing member 1.

Figure 3:
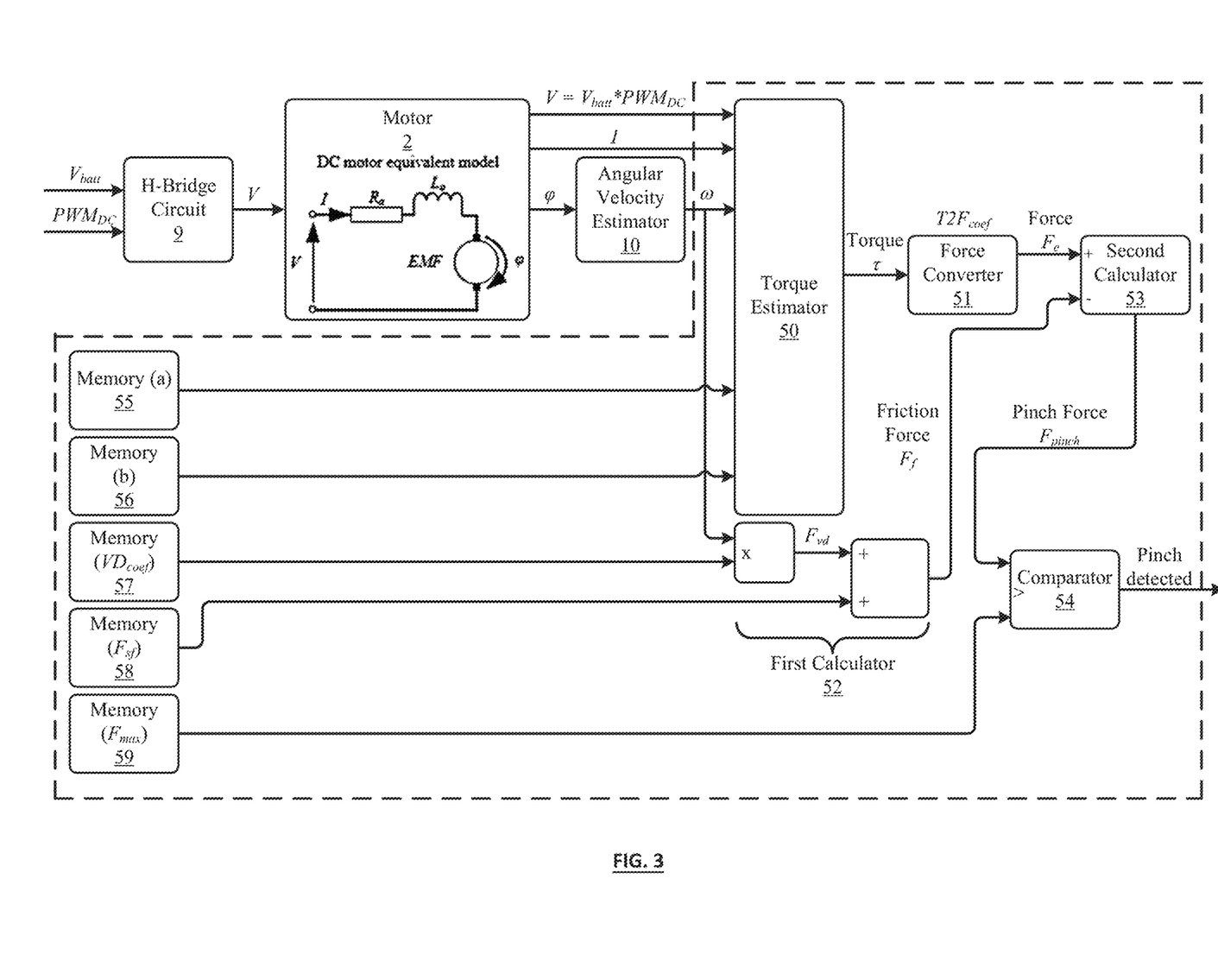
FIG. 3 shows a functional block diagram of the pinch detector of FIG. 2.

FIG. 3 shows the pinch detector 5 in more detail and the inputs of the pinch detector 5.

The pinch detector 5 is suitable to detect a pinch at the closing member 1 actuated by the motor 2. The motor 2 is schematically represented by a DC motor equivalent model in FIG. 3. As shown in FIG. 3, this DC motor model includes a resistance Ra equivalent to the windings resistance, an inductance La equivalent to the windings inductance and a component of electromotive force EMF, connected in series.

The pinch detector 5 includes a torque estimator 50, a torque to force converter 51, a first calculator 52 to calculate a friction force, a second calculator 53 to calculate an estimated pinch force and a comparator 54 to compare the estimated pinch force $F_{pinch}$ and a force limit $F_{max}$.

The pinch detector 5 has access to one or more memories 55-59 storing predetermined data including:

two coefficients "a", "b" of a linear approximation function of an energy efficiency coefficient of the motor 2;

a viscosity damping coefficient $VD_{coef}$ of the motor 2;

a static friction force $F_{sf}$ of the motor 2;

a pinch force limit $F_{max}$, for example 100 N, that should not be exceeded when an object is squeezed by the member 1 in a closing movement of the member 1.

The one or more memories 55-59 storing the above data can be internal memories of the pinch detector 5, or external memories (for example memories of the control apparatus 4).

In the presently described embodiment, the motor angular velocity estimator 10 and the calculator 11 are external to the pinch detector 5. As previously indicated, they could be internal components of the pinch detector 5.

The pinch detector 5 can be a functional element that is implemented by the controlling apparatus 4 executing a program for pinch detection. Therefore, the present disclosure also concerns a non-transitory computer readable medium including program instructions for causing a processor to execute the method for pinch detection described below in steps S5 to S11.

The mechanical power P generated by the motor 2 can be expressed as follows:

$$P = \tau \cdot \omega \quad \text{(equation 1)}$$

where $\tau$ is the motor torque, and $\omega$ is the motor angular velocity.

The electrical power $P_e$ consumed by the motor 2 can be expressed as follows:

$$P_e = V \cdot I \quad \text{(equation 2)}$$

where V is the voltage directly supplied to the motor 2 and I is the motor current (i.e. the current flowing through the armature windings of the motor).

The energy conversion efficiency $\eta$ of the motor 2 can be expressed as follows:

$$\eta = \frac{P}{P_e} \quad \text{(equation 3)}$$

It results from a combination of the above equations (1) to (3) that the energy conversion efficiency $\eta$ of the motor 2 can be expressed as follows:

$$\eta = \frac{P}{P_e} = \frac{\tau \cdot \omega}{V \cdot I} \quad \text{(equation 4)}$$

Therefore, it results from the last expression of the above equation (4) that the motor torque r can be estimated based on the following formula:

$$\tau = \eta \cdot \frac{V \cdot I}{\omega} \quad \text{(equation 5)}$$

An average (constant) value of the efficiency coefficient $\eta$ could be used to estimate the motor torque $\tau$ but this would provide a limited precision. In order to improve the estimation of the motor torque $\tau$, the value of the energy conversion efficiency $\eta$ is evaluated using an approximation function that gives an approximated value of $\eta$ as a function of the motor torque. In the first embodiment, this approximation function is a linear function that can be expressed as follows:

$$\eta = a \tau + b \quad \text{(equation 6)}$$

where "a" and "b" are the two coefficients of the linear approximation of $\eta$. These coefficients (a, b) are respectively stored in the memories 55, 56.

Figure 4:
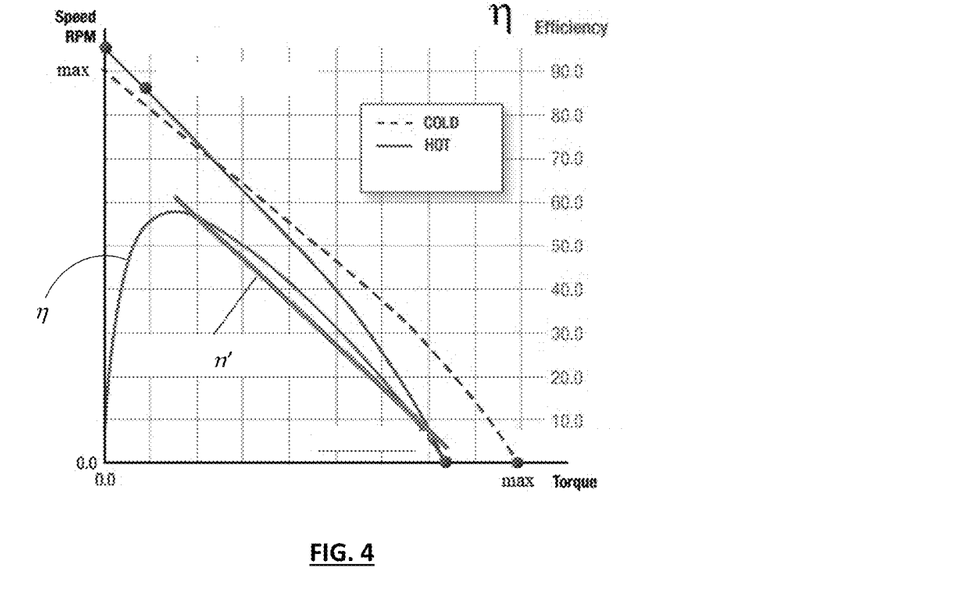
FIG. 4 shows an approximation function of an energy conversion efficiency of the motor of FIG. 2.

FIG. 4 shows the energy conversion efficiency $\eta$ as a function of the motor torque $\tau$ and a linear approximation $\eta'$ of it, based on the equation (6), within a limited range of the torque values. FIG. 4 also shows the relationship between the motor speed in RPM (rotation per minute) and the motor torque $\tau$. Two situations are represented: a first situation when the motor 2 is cold (dotted line) and a second situation when the motor 2 is hot (solid line).

In operation, in a step S5 (following steps S1 to S4), the torque estimator 50 estimates a motor torque $\tau$ from current values of physical quantities of the motor 2. In the present embodiment, these physical quantities include a motor voltage, a motor current, and a motor speed. More precisely, in the first embodiment, the torque estimator 50 takes as inputs the voltage V supplied to the motor 2, the motor armature current I, and the motor angular velocity $\omega$. The voltage V is calculated by the calculator 11 using the measured battery voltage $V_{batt}$ and the PWM duty cycle $PWM_{DC}$. If the system 100 has no PWM controller embedded, the voltage V is equal to the battery voltage $V_{batt}$. The motor armature current I is measured by the measuring circuit 3a. The angular velocity $\omega$ is provided by the estimator 10, as explained later.

The torque estimator 50 uses the two coefficients "a" and "b" of the linear approximation function to calculate an estimation of the motor torque from the current values of V, I and $\omega$, based on the following equation:

$$\tau = \frac{b \cdot V \cdot I}{\omega - a \cdot V \cdot I} \quad \text{(equation 7)}$$

The above equation (7) results from the equations (1), (6), (3) and (2), which give the equivalent expressions below:

$$\eta = a \cdot \tau + b = a \cdot \frac{P}{\omega} + b = a \cdot \frac{\eta \cdot P_e}{\omega} + b = a \cdot \frac{\eta \cdot V \cdot I}{\omega} + b \quad \text{(equation 8)}$$

And, it results from the last expression of the above equation (8) that $\eta$ can be expressed as follows:

$$\eta = \frac{b}{1 - a \cdot \frac{V \cdot I}{\omega}} \quad \text{(equation 9)}$$

Based on the equations (5) and (9), the expression of the motor torque given by the equation (7) can be obtained.

It is further assumed that an estimation of the motor force $F_e$ can be calculated from the estimated motor torque $\tau$, by conversion, based on the following expression:

$$F_e = T2F_{Coef} \cdot \tau = T2F_{Coef} \cdot \frac{b \cdot V \cdot I}{\omega - a \cdot V \cdot I} \quad \text{(equation 10)}$$

where $F_e$ is the estimated motor force, $\tau$ the motor torque estimated by the torque estimator 50 and $T2F_{Coef}$ is a torque to force conversion coefficient.

The torque to force conversion coefficient $T2F_{Coef}$ is a constant that is predetermined and stored in memory in the torque to force converter 53. For example, the coefficient $T2F_{Coef}$ can be given by the motor manufacturer.

In a step S6, the torque to force converter 51 calculates an estimated motor force $F_e$ based on the equation (10) and taking as input the estimated torque from the torque estimator 50. The output of the converter 51 gives a first estimation of the pinch force $F_{pinch}$.

Due to mechanical losses, the pinch force $F_{pinch}$ effectively exerted by the member 1 on a pinched object (i.e., an object squeezed between the member 1 actuated by the motor 2 and a member frame for example) is not equal to the estimated force $F_e$ but is less than the estimated force $F_e$. The difference can be approximated by a friction force $F_f$. The relationship between the forces $F_{pinch}$ and $F_e$ can be expressed by the following equation:

$$F_{pinch} = F_e - F_f \quad \text{(equation 11)}$$

The friction force can be modelled as a sum of a static friction force $F_{sf}$ and a viscosity damping force $F_{vd}$ and expressed as follows:

$$F_f = F_{sf} + F_{vd} \quad \text{(equation 12)}$$

The static friction force $F_{sf}$ can be approximated by a constant value. It is predetermined and stored in the memory 58.

The viscosity damping force $F_{vd}$ can be approximated as a function of the angular motor speed $\omega$, and expressed as follows:

$$F_{vd} = VD_{Coef} \cdot \omega \quad \text{(equation 13)}$$

where $VD_{Coef}$ is a viscosity damping coefficient, that is a constant stored in the memory 57. This viscosity damping coefficient can incorporate several viscosity damping coefficients of the mechanical system including the window 1 and the DC motor 2, like the viscosity damping coefficient between an armature shaft and bearings inside the DC motor, the viscosity damping coefficient of a worm-gear that connects the DC motor 2 and a mechanical part of the window lift system, the viscosity damping between the window 1 and seals around the window frame.

In operation, in steps S7 and S8, the first calculator 52 calculates the friction force $F_f$. In the step S7, the calculator 52 takes as inputs the angular motor speed $\omega$ calculated by the estimator 10 and the coefficient $VD_{Coef}$ stored in the memory 57 to calculate the viscosity damping force $F_{vd}$ using the equation (13). Then, in the step S8, the calculator 52 adds the calculated viscosity damping force $F_{vd}$ and the static friction force $F_{sf}$ stored in the memory 58, to compute the estimated friction force $F_f$. Thus, the estimation of the friction force is calculated by the first calculator 52 based on the following expression:

$$F_f = F_{sf} + VD_{Coef} \cdot \omega \quad \text{(equation 14)}$$

Then, in a step S9, the second calculator 53 calculates the pinch force $F_{pinch}$ based on the equation (11), taking as inputs:

the output from the torque to force converter 51 (e.g. the estimated force $F_e$ calculated based on the equation 10), and the output from the first calculator 52 (e.g. the estimated friction force $F_f$ calculated based on the equation 14).

Thus, the second calculator 53 calculates an estimation of the pinch force $F_{pinch}$ based on the following formula:

$$F_{pinch} = \left( T2F_{Coef} \cdot \frac{b \cdot V \cdot I}{\omega - a \cdot V \cdot I} \right) - (F_{sf} + VD_{Coef} \cdot \omega) \quad \text{(equation 15)}$$

Then, in a step S10, the comparator 54 compares the estimated pinch force $F_{pinch}$ calculated by the second calculator 53 with the force limit $F_{max}$ stored in the memory 59. This force limit $F_{max}$ can be the maximum force the member (here a window in a vehicle) is allowed to exert on any object according to a standard. For example, $F_{max}$ can be set to 100 N. Alternatively, the force limit $F_{max}$ can be less than the maximum force allowed by the standard, in order to detect a pinch in advance, before reaching this maximum force. For example, the force limit $F_{max}$ is set to a value within a range between 50 N and 80 N, for example 70 N. When the estimated pinch force $F_{pinch}$ exceeds the force limit $F_{max}$, the comparator 54 transmits a warning signal (output signal) indicating that a pinch has been detected to the control apparatus 4, in a step S11.

When a pinch is detected, and upon reception of the warning signal from the pinch detector 4, a control signal is generated by the control apparatus 4 to reverse its direction of movement so as to open the member 1 (i.e., to change the closing movement rapidly into an opening movement), in a step S12. Alternatively, the control signal could only stop the movement of the member 1.

Figure 5:
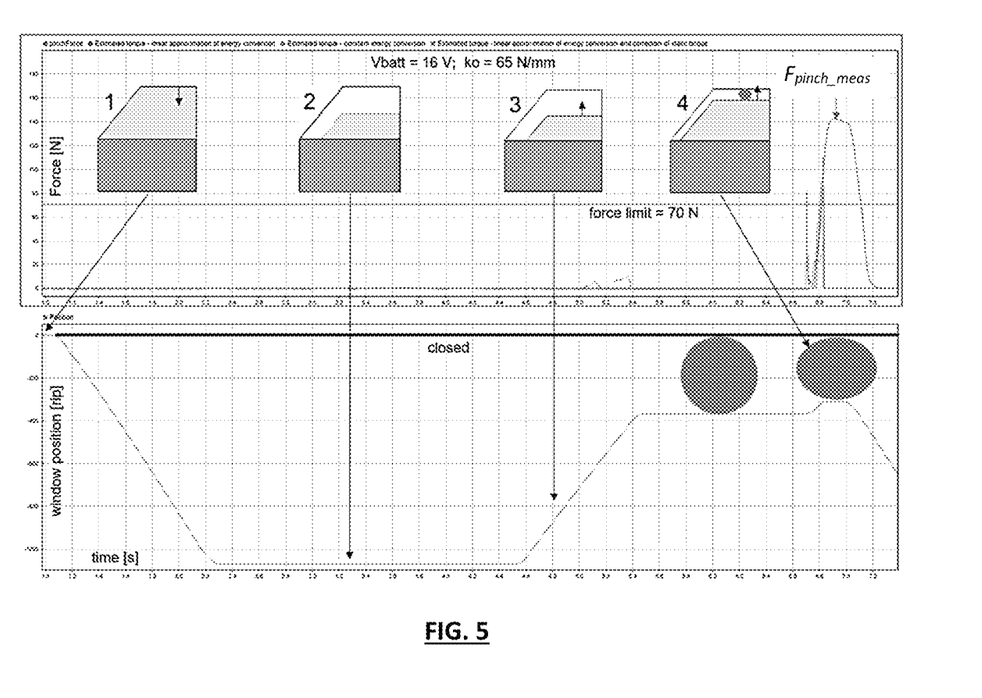
FIG. 5 shows a member movement scenario, the member having a high speed, and, during this scenario, the evolutions over time of a measured pinch force and different approximations of the pinch force.

The most challenging situation for pinch detection is when the window (or more generally the member 1) is closing with the fastest speed and squeezing the stiffest obstacle. Let's consider a use case in which the battery voltage $V_{batt}$ is equal to 16 V, which causes the window to move fast, and the obstacle stiffness $k_o$ is 65 N/mm, which corresponds to a very stiff obstacle. An algorithm of pinch detection in a window movement scenario is represented schematically in the top diagram of FIG. 5 that shows the successive positions of the window 1 in successive stages of the window movement scenario:

stage (1): the window that is initially completely closed is slightly opened and stopped;

stage (2): the opening of the window is then continued until half the height of the window and stopped in this intermediate position;

stage (3): the window is then closed but stopped in another intermediate position not completely closed and an obstacle "O" having the given stiffness $k_o$=65 N/mm is placed in the left space between the window 1 and the window frame;

stage (4): the window starts closing again and squeezes the obstacle O.

In addition, the top diagram of FIG. 5 represents the evolution over time of the pinch force exerted by the window 1 on the obstacle (object) with respect to a force limit of 70 N. Four curves of pinch force are represented and correspond to:

the measured pinch force, referenced as $F_{pinch\_meas}$, a first estimated pinch force, referenced as $F_{pinch\_est\_1}$, output directly from the converter 51, that is calculated based (only) on the approximation of the energy conversion efficiency $\eta$;

a second estimated pinch force, referenced as $F_{pinch\_est\_2}$, output from the second calculator 53, that is calculated based on the approximation of the energy conversion coefficient $\eta$ and on taking in account the friction force (as a correction of the estimated force);

a third estimated pinch force, referenced as $F_{pinch\_est\_3}$, that is calculated based on a constant energy conversion efficiency $\eta_0$ (without any other approximation or correction).

Figure 6:
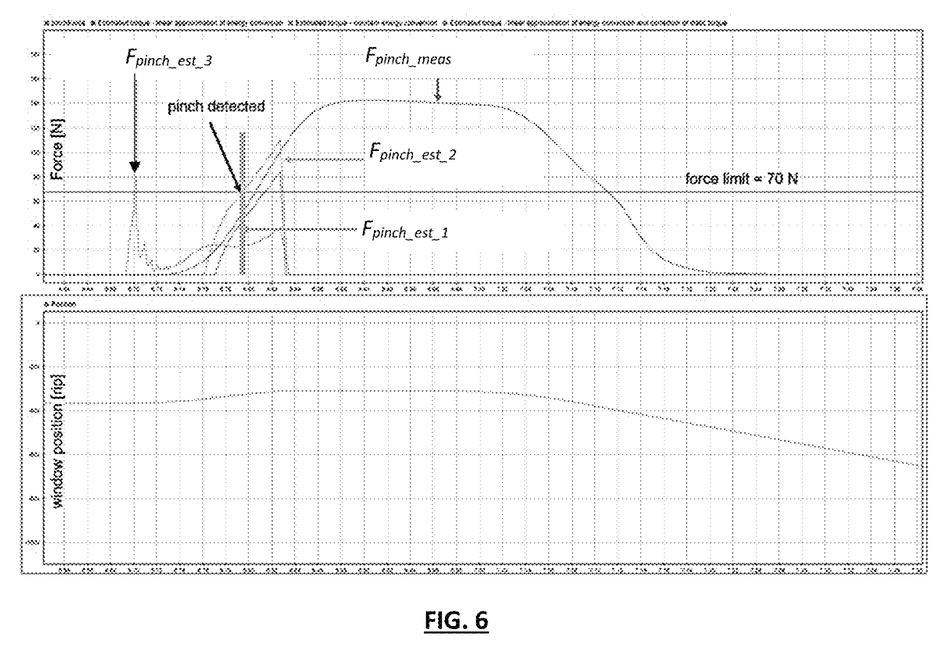
FIG. 6 shows an enlarged view of the time period of squeezing of FIG. 5.

The top diagram of FIG. 6 shows an enlarged view of the four curves when the object is squeezed. The bottom diagram of FIG. 6 shows the window position during the same period of time. The third estimation $F_{pinch\_est\_3}$ (using a constant energy conversion efficiency $\eta_0$) is far away from the measured pinch force $F_{pinch\_meas}$. The first estimation $F_{pinch\_est\_1}$ underestimates the pinch force. The second estimation $F_{pinch\_est\_2}$ overestimates the pinch force. It results from these experiments that the best estimations are $F_{pinch\_est\_1}$ (when the linear approximation of η is used) and $F_{pinch\_est\_2}$ (when the linear approximation of η and the introduction of the friction force are used at the same time). In practice, the over estimation of the pinch force ($F_{pinch\_est\_2}$) is better than the under estimation of the pinch force ($F_{pinch\_est\_1}$) because this allows earlier pinch detections, a faster reaction of the control apparatus 4 to control the motor 2 and consequently a faster opening of the window 1.

Figure 7:
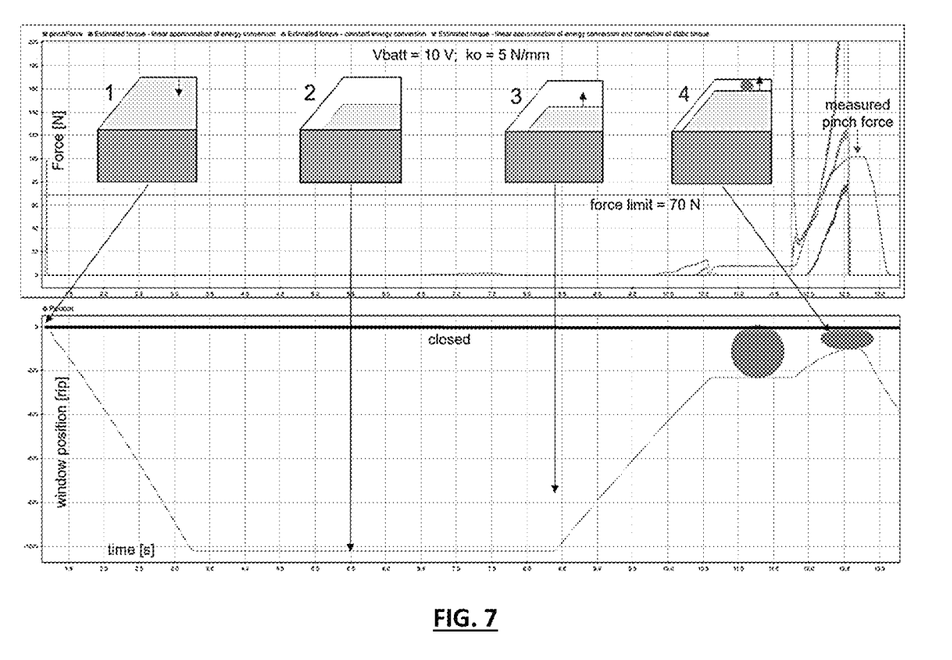
FIG. 7 shows the same member movement scenario, the member having a low speed, and, during this scenario, the evolutions over time of a measured pinch force and different approximations of the pinch force.

FIG. 7 illustrates a window moving scenario similar to the one shown in FIG. 5, including the stages (1) to (4), but in which the window is moving with a lower speed and is squeezing an obstacle O with a lowest stiffness. In this example, the battery voltage $V_{batt}$ is 10 V and the obstacle stiffness $k_o$ is 5 N/mm. The presence of an obstacle causes that the measured pinch force increases.

Figure 8:
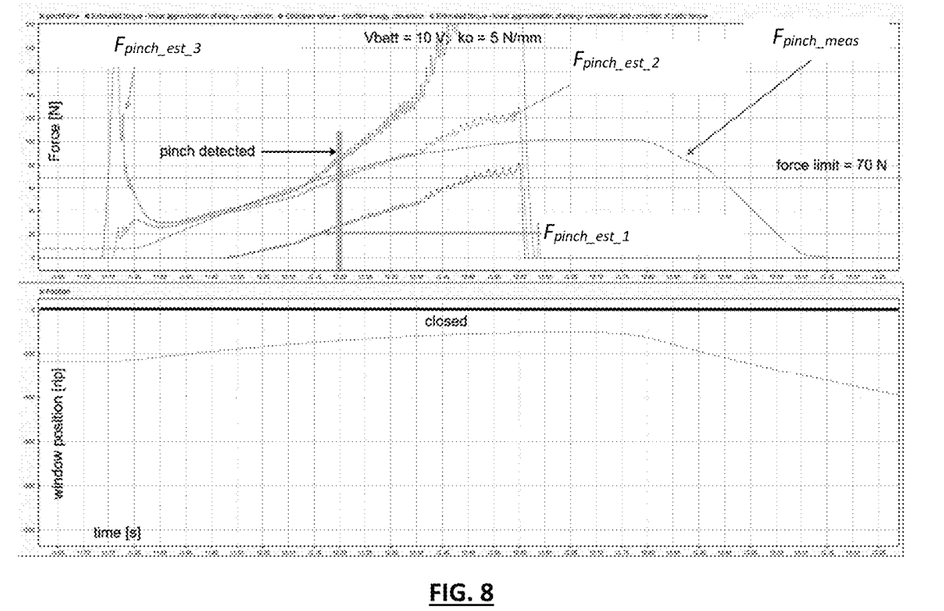
FIG. 8 shows an enlarged view of the time period of squeezing of FIG. 7.

The obstacle compression is illustrated in more detail in FIG. 8 that shows (see top diagram) the measured pinch force $F_{pinch\_measured}$, the first estimated pinch force $F_{pinch\_estimated\_1}$, the second estimated pinch force $F_{pinch\_estimated\_2}$ and the third estimated pinch force $F_{pinch\_estimated\_3}$. These experiments show that the estimated force $F_{pinch\_estimated\_2}$ gives the best prediction of the measured pinch force. This prediction is satisfactory and meets requirements to detect pinch before the force exceeds 100 N.

Figure 9:
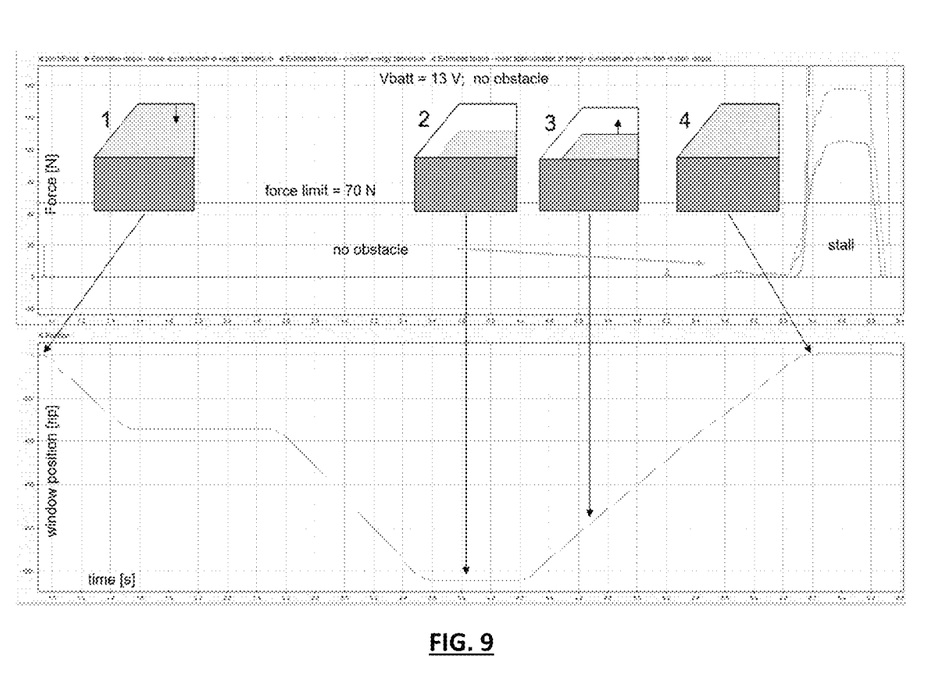
FIG. 9 shows a similar member movement scenario but without obstacle, the member having a middle (normal) speed, and, during this scenario, the evolutions over time of a measured pinch force and different approximations of the pinch force.

FIG. 9 illustrates a window moving scenario almost similar to the one shown in FIG. 5, including the stages (1) to (4), but in which the battery voltage $V_{batt}$ is 13 V and there is no obstacle placed in the space left between the window 1 and the window frame. Initially, the window 1 is completely closed. Then, after slightly opening the window 1 to a position of −350 ripples, the window 1 continued opening until it reached half height in the stage (2). Then, in the stage (3), the window 1 is moving upward until it is closed completely. The pinch detector 5 does not make a false detection of a pinch. The first and second estimated forces $F_{pinch\_estimated\_1}$ and $F_{pinch\_estimated\_2}$ are zero or almost zero.

The three scenarios illustrated in FIGS. 5, 7 and 9 show the satisfactory estimation of the pinch force made by the pinch detector 5.

The present disclosure of pinch detection processes the measured current I, the measured voltage supply $V_{batt}$ and the estimated angular velocity ω and gives an estimation of the pinch force $F_{pinch}$. The most important advantages of the present disclosure are that:

the pinch detection is based on only one simple formula given by the equation (15);
the pinch detector 5 is easy to configure and adjust to the member installation: only two parameters $VD_{coef}$ and $F_{f}$ depending on the installation receiving the member 1 (for example the door system receiving the window in a vehicle), and the approximation function of the efficiency coefficient η, depending on the motor 2, need to be characterized and set;
it is only required to measure the motor current I and the voltage supply $V_{batt}$.

Other Embodiments

In another embodiment, the measuring circuit to measure a motor voltage could measure the voltage V directly supplying the motor.

In the first embodiment, the energy efficiency coefficient of the motor is approximated by a linear function. Alternatively, a function of second order, or third order, or any other function giving an approximation of the energy conversion efficiency as a function of the motor torque could be used.

What is claimed is:

1. A control apparatus including a pinch detector configured to detect a pinch at a closing member actuated by a motor, the pinch detector further configured to receive current values of physical quantities of the motor including a motor voltage (V), a motor current (I), and a motor speed (ω), the pinch detector comprising:

a torque estimator configured to estimate a motor torque (τ) using the current values of the motor voltage (V), the motor current (I), and the motor angular speed (ω) and using coefficients of an approximation function of an energy conversion efficiency (η) of the motor, the approximation function being a function of the motor torque (τ), the energy conversion efficiency indicating a ratio of a mechanical power generated by the motor to an electrical power consumed by the motor;

a converter configured to calculate a first estimation of a pinch force ($F_{pinch}$) exerted by the closing member on a pinched object by converting the motor torque (τ) into an estimated pinch force ($F_e$) using a torque to force conversion coefficient ($T2F_{coef}$); and a comparator configured to compare the estimated pinch force ($F_{pinch}$) with a predetermined force limit ($F_{max}$) in order to detect the pinch based on a comparison result.

2. The control apparatus of claim 1, wherein the approximation function is a linear function, a second-order function, or a third-order function of the motor torque (τ).

3. The control apparatus of claim 2, wherein the torque estimator is further configured to calculate the motor torque (τ) by using the equation $$\tau = \frac{b \cdot V \cdot I}{\omega - a \cdot V \cdot I}$$

where a and b are two linear coefficients of the linear function $$\eta = a \cdot \tau + b$$

that calculates an energy conversion efficiency (η) of the motor as a function of the motor torque (τ) and V, I and ω are respectively the motor voltage, the motor current, and the motor angular speed.

4. The control apparatus of claim 1, the pinch detector further comprising:

a first calculator configured to calculate an estimation of a friction force ($F_f$) exerted by the closing member on the pinched object; and a second calculator configured to calculate a second estimation of the pinch force ($F_{pinch}$) by subtracting the friction force ($F_f$) from the estimated pinch force ($F_e$) calculated by the converter.

5. The control apparatus of claim 4, wherein the comparator is further configured to compare the second estimation of the pinch force ($F_{pinch}$) output from the second calculator with the predetermined force limit ($F_{max}$) in order to detect the pinch.

6. The control apparatus of claim 4, wherein the first calculator is further configured to calculate the friction force ($F_f$) as a sum of a static friction force ($F_{sf}$) and a viscosity damping force ($F_{vd}$).

7. The control apparatus of claim 6, wherein the first calculator is further configured to calculate an approximation of the viscosity damping force ($F_{vd}$) by multiplying the motor speed (ω) with a viscosity damping coefficient ($VD_{coef}$).

8. The control apparatus of claim 6, wherein the first calculator is further configured to read a fixed value of the friction force ($F_f$) in a memory.

9. A system comprising:
- a member configured to open and close;
- a motor for activating the member;
- a first measuring circuit configured to measure a motor voltage (V);
- a second measuring circuit configured to measure a motor current (I);
- a motor angular speed estimator configured to estimate a motor angular speed ($\omega$) of the motor from the motor voltage (V) and the motor current (I); and
- a pinch detector comprising:
  - a torque estimator configured to estimate a motor torque ($\tau$) from current values of physical quantities of the motor including the motor voltage (V), the motor current (I), and the motor angular speed ($\omega$) and using coefficients of an approximation function of an energy conversion efficiency ($\eta$) of the motor, the approximation function being a function of the motor torque ($\tau$), the energy conversion efficiency indicating a ratio of a mechanical power generated by the motor to an electrical power consumed by the motor;
- a converter configured to calculate a first estimation of a pinch force ($F_{pinch}$) exerted by the member on a pinched object by converting the motor torque ($\tau$) into an estimated pinch force ($F_e$) using a torque to force conversion coefficient ($T2F_{coef}$); and
- a comparator configured to compare the estimated pinch force ($F_{pinch}$) with a predetermined force limit ($F_{max}$) in order to detect the pinch based on a comparison result.

10. The system of claim 9, the system further comprising:
- a control apparatus configured to control the member; and
- a controller configured to generate a control signal to control at least one of two actions of stopping the member or reversing a direction of movement of the member when the pinch is detected.

11. The system of claim 10, wherein the system is integrated in a vehicle.

12. The system of claim 9, wherein the torque estimator is further configured to calculate the motor torque ($\tau$) by using the equation $$\tau = \frac{b \cdot V \cdot I}{\omega - a \cdot V \cdot I}$$

where a and b are two linear coefficients of the linear function
$\eta = a \cdot \tau + b$
that calculates an energy conversion efficiency ($\eta$) of the motor as a function of the motor torque ($\tau$) and V, I and $\eta$ are respectively the motor voltage, the motor current, and the motor angular speed.

13. The system of claim 9, wherein the approximation function is a linear function, a second-order function, or a third-order function of the motor torque ($\tau$).

14. The system of claim 9, wherein the pinch detector further comprises:
- a first calculator configured to calculate an estimation of a friction force ($F_f$) exerted by the member on the pinched object; and
- a second calculator configured to calculate a second estimation of the pinch force ($F_{pinch}$) by subtracting the friction force ($F_f$) from the estimated pinch force ($F_e$) calculated by the converter.

15. The system of claim 14, wherein the comparator is further configured to compare the second estimation of the pinch force ($F_{pinch}$) output from the second calculator with the predetermined force limit ($F_{max}$) in order to detect the pinch.

16. The system of claim 14, wherein the first calculator is further configured to calculate the friction force ($F_f$) as a sum of a static friction force ($F_{sf}$) and a viscosity damping force ($F_{vd}$).

17. The system of claim 16, wherein the first calculator is further configured to calculate an approximation of the viscosity damping force ($F_{vd}$) by multiplying the motor speed ($\omega$) with a viscosity damping coefficient ($VD_{coef}$).

18. The system of claim 16, wherein the first calculator is further configured to read a fixed value of the friction force ($F_f$) in a memory.

19. A method comprising:
- estimating a motor torque ($\tau$) from current values of physical quantities of a motor using coefficients of an approximation function of an energy conversion efficiency ($\eta$) of the motor, the physical quantities of the motor including a motor voltage (V), a motor current (I), and a motor speed ($\omega$), the approximation function being a function of the motor torque ($\tau$), the energy conversion efficiency indicating a ratio of a mechanical power generated by the motor to an electrical power consumed by the motor, the motor being configured to actuate a member;
- calculating a first estimation of a pinch force ($F_{pinch}$) exerted by the member on a pinched object by converting the estimated motor torque ($\tau$) into an estimated pinch force ($F_e$) using a torque to force conversion coefficient ($T2F_{coef}$); and
- comparing the estimated pinch force ($F_{pinch}$) with a predetermined force limit ($F_{max}$) in order to detect a pinch based at the member on a comparison result.

20. The method of claim 19, wherein the step of estimating the motor torque uses the equation $$\tau = \frac{b \cdot V \cdot I}{\omega - a \cdot V \cdot I}$$

where a and b are the two linear coefficients of the linear function
$\eta = a \cdot \tau + b$
that calculates an energy conversion efficiency ($\eta$) of the motor as a function of the motor torque ($\tau$) and V, I and $\omega$ are respectively the motor voltage, the motor current, and the motor angular speed.

* * * * *

UNITED STATES PATENT AND TRADEMARK OFFICE
CERTIFICATE OF CORRECTION

PATENT NO. : 11,735,905 B2
APPLICATION NO. : 17/513809
DATED : August 22, 2023
INVENTOR(S) : Pawel Wojtasinski and Mateusz Romaszko It is certified that error appears in the above-identified patent and that said Letters Patent is hereby corrected as shown below:

In the Claims

Column 13, Lines 55 and 56, after "and" before "are" delete "$\eta$" insert --$\omega$--

Signed and Sealed this
Twenty-sixth Day of September, 2023

Katherine Kelly Vidal
*Director of the United States Patent and Trademark Office*